United States Patent [19]
Soldate

[11] 3,915,890
[45] Oct. 28, 1975

[54] VIBRATING CHEMICAL REACTOR AND REGENERATOR

[76] Inventor: Albert M. Soldate, 276 Hacienda Drive, Arcadia, Calif. 91006

[22] Filed: Nov. 30, 1973

[21] Appl. No.: 420,692

[52] U.S. Cl. .......... 252/411 R; 23/288 B; 23/288 E; 23/288 F; 198/220 DB; 252/417; 259/1 R; 259/DIG. 17; 259/DIG. 42; 259/72
[51] Int. Cl.².... B01J 37/00; B01J 8/00; B08B 3/12; B65G 27/00
[58] Field of Search... 252/411, 417; 23/284, 288 B, 23/288 E, 288 F, 288 S; 259/DIG. 42, 1 R, 72, DIG. 17; 198/220 DB

[56] References Cited
UNITED STATES PATENTS

| | | | |
|---|---|---|---|
| 2,330,664 | 9/1943 | Bennett | 423/213.5 |
| 2,498,405 | 2/1950 | Fader | 23/288 S |
| 2,747,976 | 3/1956 | Houdry | 23/288 F |
| 2,772,147 | 11/1956 | Bowen et al. | 23/288 F |
| 3,281,395 | 10/1966 | Fukita et al. | 23/288 E |
| 3,343,812 | 9/1967 | Moulton | 198/220 DA |
| 3,358,815 | 12/1967 | Musschoot et al. | 198/220 DB |
| 3,582,288 | 6/1971 | Taylor et al. | 23/288 S |
| 3,604,555 | 9/1971 | Cowper | 198/220 DB |

FOREIGN PATENTS OR APPLICATIONS

| | | | |
|---|---|---|---|
| 1,251,989 | 10/1967 | Germany | 198/220 DB |

*Primary Examiner*—Patrick P. Garvin
*Assistant Examiner*—P. E. Konopka
*Attorney, Agent, or Firm*—Christie, Parker & Hale

[57] ABSTRACT

A system for imparting vibratory energy to solid particulate matter includes a resiliently mounted vibrator body, and a pair of counterweights on opposite ends of a rotating vertical shaft engaged with the vibrator body but adapted to rotate with the counterweights independently of the vibrator body. A drive motor engaged with the vertical shaft rotates the shaft about its axis to rotate the counterweights and thereby impart a relatively large amplitude vibratory motion to the vibrator body. A closed conduit carried on the vibrator body contains solid particulate matter which travels in a fluidized condition along a linear path through the conduit in response to vibration of the vibrator body. In one form of the invention, the vibrator body comprises a reaction chamber for receiving a gas flow and contacting it with an appropriate solid particulate catalyst contained in the reaction chamber and adapted to promote desired reactions between chemical components of the gas phase. The vibrational energy imparted to the reaction chamber causes catalyst particles to flow in a continuous fluidized circulating path from the reaction chamber through a suitable catalytic regeneration chamber and back to the reaction chamber. Preferably, the drive motor is coupled with the rotating shaft of the vibrator body through a vertically extending torsion shaft having suitable torsional strength for required torque transmission but with sufficient torsional and lateral flexibility to prevent substantial vibrational energy from being transmitted by the vibrator body to the drive motor and its bearings.

9 Claims, 6 Drawing Figures

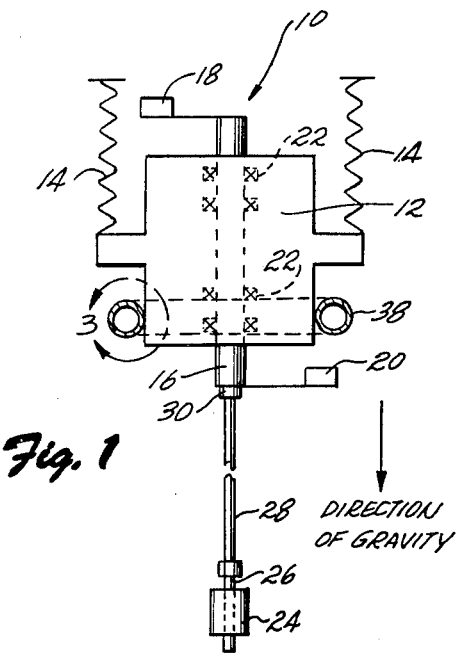
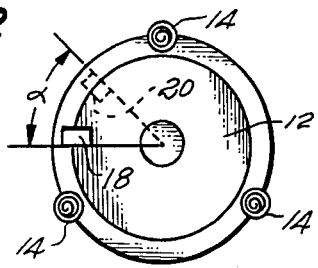
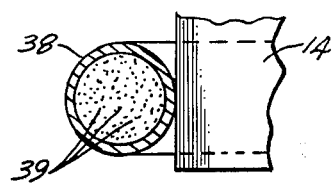
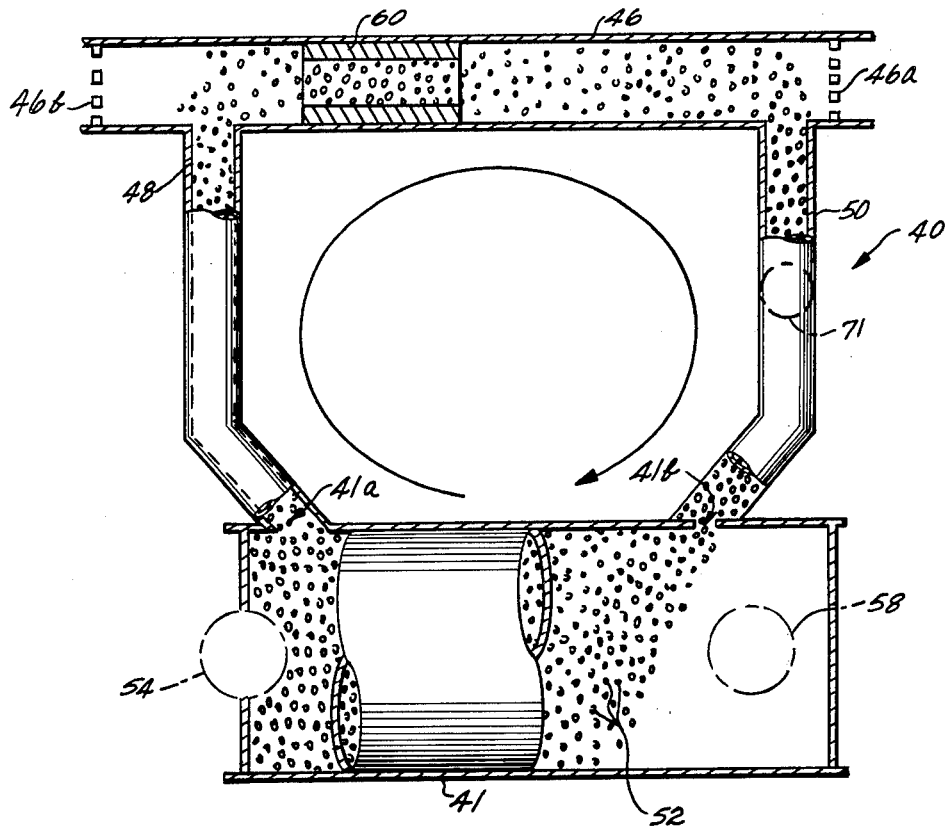

VIBRATING CHEMICAL REACTOR AND REGENERATOR

BACKGROUND

This invention relates to a method and apparatus for producing vibrational energy and for using the resulting vibrational energy in a material transport system.

In the past there have been a variety of industrial applications for mechanical vibrators, such as in separators for screenable materials, grinding mills, and finishing mills for deburring metals, for example. A typical mechanical vibrator contemplated by this invention is the FM Series finishing mill manufactured by SWECO, Inc. of Los Angeles, Calif. Such a mechanical vibrator includes an annular vessel for containing parts to be finished and a suitable grinding media. A double-ended electric motor is fixed to the lower end of a cylindrical column, and calibrated counterweights are mounted at both ends of the motor shaft. The motor and the vessel are supported by compression springs, and the angular velocity developed by the motor output shaft vibrates the vessel and the material contained in it.

The present invention is based, in part, on the recognition that the drive motor of the mechanical vibrator described above is integrated into the active or vibrating portion of the system, which results in a large amount of vibration being transmitted to the motor and the motor bearings during use of the vibrator. Consequently, the motor bearings wear out in a relatively short length of time. The bearings are part of the motor and are difficult to remove for replacement, which adds substantially to the maintenance cost of the vibrator assembly. In addition, the recommendations of the motor supplier must be considered whenever it is desired to change the bearings.

SUMMARY

This invention, in part, provides a mechanical vibrator in which the drive motor is separated from the active or vibrating portion of the vibrator assembly. Briefly, the vibrator includes a vibrator body, a rotatable shaft mounted to the vibrator body to rotate about its axis independently of the vibrator body, spaced apart counterweights engaged with opposite ends of the shaft to rotate with the shaft, and means for resiliently mounting the vibrator body. A drive motor located remote from the vibrator body is engaged with the rotatable shaft through an elongated torsion shaft having both torsional and lateral flexibility. The drive motor rotates the shaft and counterweights to vibrate the vibrator body. The torsion shaft has sufficient lateral flexibility and low mass to permit substantial unrestrained vibration of the vibrator body and to prevent any appreciable vibrational energy from being transmitted to the drive motor and its bearings.

Since the drive motor is separated from the vibrating portion of the system, the bearings which mount the rotatable shaft to the vibrator body can be changed without disturbing the drive motor. Since the bearings can be changed at will, it is also practicable to use different types of vibrator shaft bearings depending upon the particular use of the vibrator. Preferred uses of the vibrator assembly would be as a separator, grinding mill, or finishing mill. The separation of the drive motor from the vibrating portion of the system also is an advantage if explosion or fire hazards are present because of the type of process materials used in the applications discussed above.

In one embodiment of the invention, carrier means are mounted on the vibrator body for containing a suitable medium to receive the vibrational energy developed by the vibrator. The vibrator is subjected to large amplitude vibrations sufficient to cause solid particulate matter contained in the carrier means to travel through the carrier in a fluidized condition. Thus, the vibrator of this invention can be used as a material transport apparatus, and in the preferred form of the invention, the vibrator body comprises a reaction chamber of closed cross-section for receiving a flow of gas to be contacted with a suitable particulate catalyst contained in the reaction chamber for promoting desired reactions between chemical components of the gas phase. The vibrational energy imparted to the reaction chamber causes the catalyst particles to flow continuously in a fluidized condition from the reaction chamber through a suitable catalyst regeneration chamber and back through the reaction chamber.

These and other aspects of the invention will be more fully understood by referring to the following detailed description and the accompanying drawings.

DRAWINGS

FIG. 1 is a fragmentary schematic elevation view, partly in cross-section, showing a mechanical vibrator according to this invention;

FIG. 2 is a schematic plan view illustrating a phase angle relationship between a pair of counterweights in the vibrator of FIG. 1;

FIG. 3 is an enlarged fragmentary cross-sectional elevation view illustrating particulate matter flowing in a fluidized condition through the tubular conduit of the vibrator shown in FIG. 1;

FIG. 6 is a semi-schematic plan view, partly broken away, illustrating a particulate catalyst circulating in a fluidized condition through the catalyst regeneration system of FIG. 5.

DESCRIPTION

Figure 4:
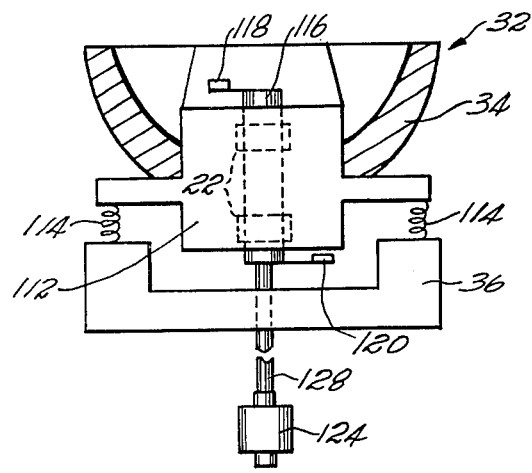
FIG. 4 is a fragmentary schematic elevation view, partly in cross-section, illustrating a preferred use of the vibrator of FIG. 1 in a finishing or grinding mill.

FIG. 1 schematically illustrates a mechanical vibrator 10 having a vibrator body 12 which is resiliently supported by several radially spaced apart coil springs 14. Preferably, vibrator body 12 is mounted by three equidistantly spaced apart springs. An asymmetrically loaded, vertically extending, rigid rotatable shaft 16 is supported by the vibrator body. The top and bottom ends of shaft 16 carry vertically spaced apart counterweights 18 and 20, respectively, adapted to rotate with the shaft in corresponding horizontal planes. Shaft 16 is mounted to vibrator body 12 by a pair of vertically spaced apart anti-friction bearings 22 which allow the shaft 16 and counterweights to rotate independently of the vibrator body.

A variable speed electric motor 24 drives a rotary double-ended motor output shaft 26 which, in turn, is coupled to shaft 16 by a vertically extending, tubular, elongated torsion drive shaft 28. The torsion shaft preferably is tubular and of relatively small diameter and thus is relatively light in weight as well as having torsional and lateral flexibility and suitable torsional strength to transmit torques of the required magnitude. By way of example, the torsion shaft in many applications can comprise a thin plastic tube approximately 3/32 inch in diameter.

During use of vibrator 10, motor 24 drives torsion shaft 28 which, in turn, rotates shaft 16 about its axis at a constant angular velocity. This causes the spring supported body 12 and shaft 16 to vibrate as a unit, the vibration consisting of small periodic movements that consist of either translations in the horizontal plane, or tipping of the vertical axis, or a combination of both, depending upon the mass of the rotating counterweights and their angular displacement (the angle α shown in FIG. 2). The mass of the counterweights is small compared to that of the spring supported body. Moreover, the torsion drive tube is kept somewhat slack in its connections 30 to rigid shaft 16, so that angular and/or translational displacement of the spring supported body and rotating shaft assembly are not appreciably affected by the presence of the torsion shaft.

One preferred use of vibrator 10 is in a vibrating finishing or grinding mill 32 illustrated in FIG. 4. Such a mill includes an annular open-topped vessel 34 carried by a vibrator body 112 which is resiliently mounted on a base 36 by coil springs 114. Finishing or grinding operations take place in the well known manner by operating a drive motor 124 to rotate a vibrator shaft 116 and counterweights 118, 120 to impart vibrations of a suitable frequency to vessel 34 and the material contained in the vessel.

The advantage of the system shown in FIG. 4 is that motor 124 is not integrated into the vibrating portion of the system. Most of the vibrational energy developed by the vibrator and vessel is absorbed by flexible torsion shaft 128 and therefore is not transmitted to the motor. Thus, the useful life of the motor is substantially increased when compared with the prior art vibrators in which the motor is integrated directly into the vibrating portion of the system. Moreover, if shaft bearings 122 need replacement, they can be readily changed without disturbing the motor. Bearings 122 also can be readily changed at will in accordance with the particular application of the vibrator assembly.

I have constructed a vibrator in accordance with the model shown in FIG. 1 and have observed the motion of various objects resulting from vibratory energy being imparted to them from vibrator 10. In one series of experiments, a continuous circular tubular conduit 38 was supported around the bottom of vibrator body 12, and observations were made of the motions of various solid particulate objects placed inside the conduit and induced by the vibrating motion of vibrator body 12. It was observed that objects moved in a systematic fashion within the conduit. The objects used included steel balls, lead balls, granulated sugar, table salt, flour, and irregular shapes of lead, plastic, and felt. It was also observed that conduit 38 could be raised at one end to form a helix and that objects could be moved uphill, i.e. against gravity, through the helix.

In experiments conducted with vibrator 10, several distinct modes of material transport have been observed, and are as follows:

1. In response to relatively small amplitude horizontal displacement and angular displacement of vibrator body 12 and relatively small angular velocities of rotating shaft 16, particulate objects other than balls tend to slide along the bottom surface of conduit 38. There was a pronounced dependence upon the phase relationship between the two counterweights. For example, if the angle α shown in FIG. 2 was changed from positive (top angle leading the bottom weight in a counterclockwise direction of rotation, as illustrated in FIG. 2) to negative (top weight following the bottom weight in a counterclockwise direction of rotation), the direction of material transport was reversed.

2. In response to larger vibrational amplitudes and larger angular frequencies, objects other than balls moved through the conduit in a "fluidized" condition. That is, at any cross-section of the conduit, the moving particles 38 were suspended in a random array, i.e., were generally uniformly dispersed throughout the cross section of the conduit, as illustrated in FIG. 3. The particle movement also was sensitive to phase relationships (the angle α in FIG. 2) between the counterweights, since reversing the lead angles between the counterweights resulted in a reversed fluidized flow. Moreover, the type of fluidized flow appeared to be relatively independent of the particulate concentration up to the point where the particles substantially filled the tube cross-section.

3. At still larger values of vibrational amplitude and angular rotation, but where the displacement of the vibrator body in the vertical direction was kept within previous ranges, fluidized flow again was observed with objects other than balls. In this instance, velocities of particle transmission were large, but were independent of angular relationships between the counterweights. That is, changing the values of the angle α in FIG. 2 from positive to negative did not change the direction of flow, which always remained in one direction, i.e. the direction of rotation of shaft 16.

4. At moderate values of vibrational amplitude and rotational frequency, balls were transmitted through the conduit 38 in a whirling fashion. That is, the balls rolled on the inner diameter of the conduit in a helical path directed along the tangential centerline of the conduit. The direction of ball translation again was the same for positive or negative values of the angle α in FIG. 2, but the translational velocity was found to be zero when the top and bottom counterweights were aligned so that the angle α is 180°.

The fluidized particle transport provided by vibrator 10 can be used in a gas-solid phase fluidized bed reactor. By way of example, a typical prior art fluidized bed reactor is used to carry out various physical or chemical reactions by suspending an otherwise static bed of solid particles in a stream of gas. Vibrator 10 provides a different type of fluidized bed reactor in which the fluidized stream of particulate matter can be made to flow against an air stream (as well as against gravity). For example, in my observations it was noted that particles of table salt could be induced to flow in a fluidized condition against air streams having a nominal flow rate (velocity of gas stream in an empty tube) of at least 200 centimeters per second. Furthermore, the flow experiment was conducted with a plastic tube nearly completely filled with salt, i.e., its cross-sectional area was nearly packed tight, which corresponds to particulate concentrations found normally in commercial fluidized reactors. Thus, the vibrator assembly 10 can be used in certain small scale chemical treatment operations in which a solid particulate material can be reacted with a stream of gas flowing countercurrent to the fluidized flow of the particulate material.

Figure 5:
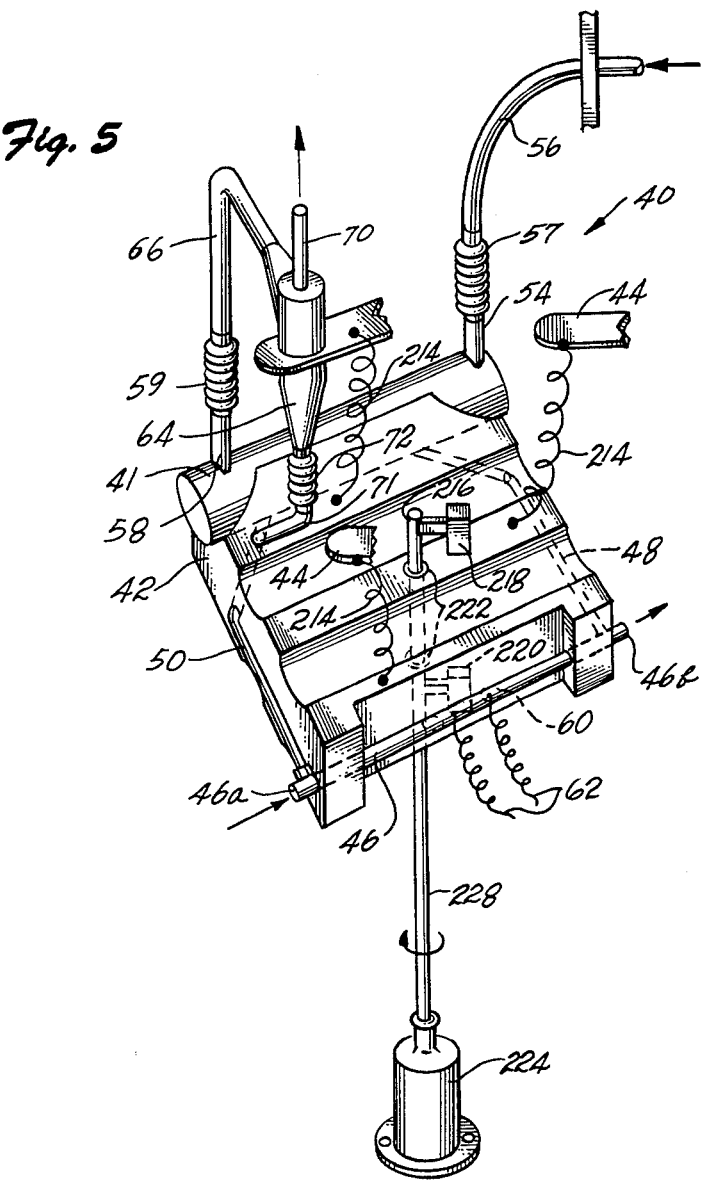
FIG. 5 is a fragmentary semi-schematic perspective view illustrating the use of the vibrator of FIG. 1 in a system for regenerating a catalyst.

Referring to FIGS. 5 and 6, one preferred use of the material transport properties of vibrator 10 is in a gas-solid phase catalytic reactor 40 in which a dry, solid particulate catalyst is continuously circulated in a fluidized condition from a reaction chamber through a catalyst regeneration chamber. The catalytic reactor includes a reaction chamber 41 in which a typical reaction takes place between gas components catalyzed by (a) particulate solid(s). The system shown in FIGS. 5 and 6 will be described in the context of a single stage reactor-regenerator for treating automobile exhaust gases, although it will be understood that the system also can be used in other gas phase, solid catalyzed reactions for continuously regenerating and/or cooling a particulate catalyst.

Reaction chamber 41 is of tubular configuration and is affixed to a rigid base 42 which, in turn, is supported by three radially spaced apart coil springs 214 suspended from corresponding fixed brackets 44. Base 42 holds the tubular reaction chamber 41 in a substantially horizontal position. Base 42 also supports an elongated tubular catalyst regeneration chamber 46 in a substantially horizontal position extending substantially parallel to reaction chamber 41. An elongated feed tube 48 is rigidly attached to base 42 so as to extend between reaction chamber 41 and regeneration chamber 46. Feed tube 48 is held in a substantially horizontal position by base 42, and the ends of the feed tube open into corresponding front portions of the reaction chamber and the regeneration chamber. Similarly, a horizontally disposed elongated return tube 50 is attached to the base and extends between end portions of the regeneration chamber and the reaction chamber. As shown best in FIG. 6, a suitable solid particulate catalyst 52 is contained in the reaction chamber.

A gas inlet tube 54 opens into a front portion of reaction chamber 41. A lead pipe 56 coming from the engine manifold is connected to inlet 54 by a flexible hose connection 57. An elongated gas exit tube 58 opens into an end portion of reaction chamber 41. A flexible hose connection 59 connects gas exit tube 58 with a remaining portion of the system which will be described below. The flexible hose connections are made of a high temperature material having sufficient flexibility to accommodate three-dimensional motion of the spring-supported mass relative to the fixed portions of the system (such as supports 44 and lead pipe 56).

During use of the reactor, exhaust gases flow from lead pipe 56 into inlet 54 and then through reaction chamber 41 where certain components of the gas are reacted in the presence of catalyst 52. The gases which remain after contact with the catalyst pass from the reaction chamber through exit tube 58. During use, the sprwg-supported mass is vibrated at a sufficiently high amplitude and suitable frequency to impart fluidized motion to the catalyst. The fluidized catalyst particles travel in a continuous circulating path from the reaction chamber through the regeneration chamber and back to the reaction chamber. Vibrational motion of the spring-supported mass is produced by a vibrator assembly substantially as shown in FIG. 1. The vibrator assembly includes an elongated rigid shaft 216 similar to shaft 16 described above and mounted to base 42 via anti-friction bearings 222. Top and bottom counterweights 218 and 220, respectively, are carried by shaft 216 to rotate with the shaft independently of base 42. A drive motor 224 is coupled to a vertically extending tubular torsion shaft 228 identical in construction to shaft 28 discussed above. The torsion shaft is engaged with the rigid shaft 216 in the manner described above in FIG. 1 so that the drive motor will rotate shaft 216 to vibrate the spring-supported mass.

The mass of counterweights 218, 220 and the phase angle $\alpha$ between the counterweights are adjusted so that relatively large amplitude vibrations, with a suitable phase relationship between the translational and angular components, are imparted to the spring-supported mass which, in turn, generates the continuous circulating flow of catalyst in a fluidized condition. As shown best in FIG. 6, the catalyst flows in a clockwise direction from reaction chamber 41 through feed tube 48, through regeneration chamber 46 and back through return tube 50 to the reaction chamber. Preferably, a tubular furnace 60 is located in the regeneration chamber so that the circulating catalyst particles can pass through the furnace. A pair of electrical leads 62 supply electrical power to the tubular furnace. Gas flow for the treatment of the catalyst (such as by burning off carbon by the passage of air through the regeneration chamber) can enter an open end 46a of the regeneration chamber. Gaseous products from the catalyst treatment exit the regeneration chamber at an open end 46b. The method of using high temperature treatment to regenerate the catalyst in chamber 46 is shown by way of example only, since it is to be understood that other suitable methods of regenerating solid catalyst particles can be used without departing from the scope of the invention.

One high temperature treatment method consists of forming tubular furnace 60 from the same material as the catalyst particles and maintaining the furnace at a substantially higher temperature than the catalyst particles. In use, the relatively cold catalyst particles impinge on the relatively high temperature surface of the tubular furnace and then rebound from the surface. The material and temperatures are both controlled so that mutual adhesion of the two contacting surfaces is greater than the intrinsic strength of either material. Preferably, the particles are solid rather than being porous. As the particles pass through the furnace, some particles stick to the surface of the furnace and then divide at a new parting line when rebounding, which causes a fresh layer (on a microscopic scale) of material from the furnace surface to cover a portion of the rebounding particle's outer surface. Consequently, with each collision, a bit of fresh catalyst surface is created. Complete regeneration of the particles can be achieved by this process by the continuous circulation of the particles through the furnace.

It should be understood that the separate regeneration chamber could be used to cool or heat the solid catalyst particles to provide control of the temperature in the reaction chamber. In addition, two or more regeneration (heating or cooling or other treatments) circuits can be used in combination with one reaction chamber. The rates of circulation in each of the two or more regeneration circuits can be independently controlled, and in the case of a temperature controlling circuit, the rates of circulation could be controlled by a feedback coupling with a temperature sensing device placed either in the reaction chamber or in the gas stream which either enters or exits the reaction chamber.

Preferably, the flow of exhaust gas through reaction chamber 41 runs countercurrent to the flow of the catalyst through the reaction chamber. This relative flow produces good contact between the exhaust gas and the catalyst. The volume of catalyst circulating through the system is controlled so that feed tube 48 and return tube 50 are both maintained in a fully packed condition during the continuous circulation of the catalyst. This fully packed condition of the catalyst particles provides an effective gas seal at exit port 41a and inlet port 41b (see FIG. 6) of the reaction chamber to maintain gas flow through the reaction chamber and prevent the exhaust gas from going through feed tube 48 or return tube 50 to the regeneration chamber. The fully packed condition of feed and return tubes 48 and 50, respectively, can be maintained by suitable choice of their diameters (with respect to the reaction and regenerator tube diameters) and/or suitable positioning of orifices in the feed and return tube entrances and exits.

Thus, the gas-solid phase catalytic reactor provides means for continuously recirculating a catalyst through a separate regeneration chamber and back through a reaction chamber where the catalyst is reacted with a stream of gas flowing through the reaction chamber. The fluidized flow of catalyst through the reaction chamber is produced by means independent of the gas flow, and the catalyst flows counter-current to the gas flow which aids in preventing unusually large gas flow rates blowing the catalyst particles out of the reaction chamber. However, in some applications it may be desirable to provide means for trapping unusually large surges of catalyst from the reaction chamber. FIG. 5 illustrates a presently preferred method of trapping large surges in the catalyst. The method contemplates adding a cyclone separator 64 to the system. All exit gases from reaction chamber 41 pass through gas exit tube 58 and are then circulated through the cyclone separator by an inlet line 66 coupled to exit tube 58 by flexible hose connection 59. All gases remaining after treatment by the catalyst in the reaction chamber pass to the atmosphere from the cyclone separator through an exit tube 70. Any unusually large surges in the catalyst caused by back-firing of the engine, or otherwise unusually large flow rates of gas through the reaction chamber, will pass through inlet tube 66 into the top of the cyclone separator, and will then be returned by the separator to return tube 50 via a suitable bypass line 71 connected to the bottom of the cyclone separator by a flexible hose connection 72.

When compared with fixed-bed type catalytic reactors, the catalytic reactor of this invention has the advantage of being able to continuously regenerate the catalyst so that the useful life of the reactor is extended substantially. Moreover, the fluidized condition of the catalyst substantially prevents the occurrence of hot spots which tend to be a problem in fixed-bed reactors.

The reactor of this invention also has advantages over conventional fluidized bed reactors. For example, the reactor of this invention does not depend upon input gas flow conditions to obtain the fluidized motion of the particles. By way of contrast, the effective operation of a fluidized bed reactor would be extremely difficult where there are substantial fluctuations in the gas flow rate to the reactor as is the case with exhaust gases of automobiles during normal operation. That is, the reactor of this invention is especially suitable in applications, such as in treating the exhaust gases of automobiles, where there are substantial fluctuations in the gas flow rate to the reactor. During normal operation of an automobile, exhaust gases will pass through the reaction chamber at various flow rates, but these differing input gas flow rates will not affect the fluidized motion of the catalyst particles which obtain their fluidized condition independently of the gas flow. Thus, the reactor of this invention can accommodate various surges in the rate of gas flow through the reactor without substantial interruptions in the circulating flow of catalytic material to and from the regeneration chamber, or without substantial loss of catalyst to the atmosphere.

I claim:

1. A method for carrying out gas phase reactions in the presence of a solid particulate catalyst and for continuously regenerating the catalyst so that the regeneration and reaction steps are isolated from each other, the method including the steps of a. disposing a solid particulate catalyst in a closed circuit comprising an elongated reaction chamber of closed cross-section having a spaced apart inlet and outlet, and a regeneration chamber comprising an elongated conduit of closed cross-section having a spaced apart inlet and outlet, wherein said reaction chamber outlet communicates by a tubular feed conduit with said regenerator inlet, and said regenerator outlet communicates by a tubular return conduit with said reaction chamber inlet;

b. vibrating the reaction chamber, the feed conduit, the regeneration chamber, and the return conduit closed circuit as a unit to impart circulating fluidized translatory motion to the catalyst particles to cause the particles to travel in a generally horizontal direction along the length of the reaction chamber in a generally uniform random dispersion throughout a cross-section of the reaction chamber between the inlet and outlet openings thereof, such vibration further producing a continuous fluidized circulation of catalyst particles in a generally horizontal direction from the reaction chamber through the feed conduit, the regeneration chamber, and the return conduit of the closed circuit, respectively, and then back through the reaction chamber;

c. passing a stream of reactant gas through the reaction chamber and through the catalyst particles therein in a direction opposite to the fluidized flow of the catalyst particles for promoting suitable reactions between components of the reactant gas;

d. regenerating the fluidized catalyst particles being continuously circulated through the regeneration chamber;

e. the vibration further causing the catalyst particles to be circulated through the feed and return conduits of the closed circuit in a generally uniform, substantially completely filled cross-sectional dispersion to provide resistance to appreciable flow of reactant gas through the inlet and outlet openings of the reaction chamber so that regeneration of the catalyst particles takes place in the regeneration chamber without being affected by reactions between the reactant gas and the fluidized catalyst particles flowing through the reaction chamber; and f. wherein the reaction chamber, the feed conduit, the regeneration conduit, and the return conduit closed circuit are resiliently mounted and are engaged with a rotary shaft adapted to rotate about its axis independently of the closed circuit, and including spaced apart counterweights at opposite ends of the rotating shaft to rotate with the shaft, and drive means coupled with the shaft to rotate the shaft and counterweights to impart vibrating motion to said closed circuit; and further including the step of adjusting the mass of the counterweights, the angular relationship between the counterweights, and the vibrational frequency of the imparted vibratory motion in accordance with the type of catalyst present to produce the fluidized, circulating motion of the catalyst particles.

2. The method according to claim 1 in which the reaction chamber of the closed circuit includes spaced apart first and second openings to the atmosphere for allowing gas to flow in through the first opening, through the regeneration chamber, and out through the second opening to the atmosphere.

3. The method according to claim 2 including passing a gas for treatment of catalyst particles through the first opening, through the regeneration chamber, and out through the second opening to the atmosphere.

4. The method according to claim 3 including regenerating the catalyst particles by heating them during their passage through the regeneration chamber.

5. The method according to claim 1 including vibrating the reaction chamber and the regeneration means as a unit to produce a combined horizontal translational motion and angular displacement relative to the vertical of the unit.

6. The method according to claim 1 including regenerating the catalyst particles by cooling them during their passage through the regeneration means.

7. The method according to claim 1 including a pair of separate catalyst regenerating chambers in each of which the catalyst particles are vibrated to circulate them in a fluidized condition through separate catalyst regeneration means; and including cooling the particles in one regenerating circuit and heating in the other regenerating circuit.

8. The method according to claim 1 including regenerating the catalyst particles by passing them into contact with the surface of a furnace which is raised to a temperature substantially in excess of that of the catalyst particles, the furnace having a surface made of the same material as the catalyst and being adapted to separate from said furnace surface to create fresh atomic layers on the catalyst particles in response to impingement of the particles on the surface of the furnace.

9. The method according to claim 1 including regenerating the catalyst particles by heating them during their passage through the regeneration means.

* * * * *

UNITED STATES PATENT AND TRADEMARK OFFICE
CERTIFICATE OF CORRECTION

PATENT NO. : 3,915,890
DATED : October 28, 1975
INVENTOR(S) : ALBERT M. SOLDATE

It is certified that error appears in the above–identified patent and that said Letters Patent are hereby corrected as shown below:

Col. 5, line 56, "sprwg-supported" should read
-- spring-supported --.

Col. 9, lines 17-18 "re-action" should read
(Claim 2)           -- regeneration --.

Signed and Sealed this second Day of March 1976

[SEAL]

Attest:

RUTH C. MASON
Attesting Officer

C. MARSHALL DANN
Commissioner of Patents and Trademarks